Jan. 8, 1963 M. KÖCK 3,072,027
PHOTOELECTRIC DIAPHRAGM CONTROL DEVICES
Filed May 24, 1960 2 Sheets-Sheet 1

United States Patent Office 3,072,027
Patented Jan. 8, 1963

3,072,027
PHOTOELECTRIC DIAPHRAGM
CONTROL DEVICES
Max Köck, Nurnberg, Germany, assignor to P. Gossen
& Co. G.m.b.H., Erlangen, Germany
Filed May 24, 1960, Ser. No. 31,309
Claims priority, application Germany June 2, 1959
8 Claims. (Cl. 95—10)

This invention relates in general to cameras and in particular to a new and useful mechanism for controlling the diaphragm opening of a camera in accordance with the prevailing lighting conditions on the subject being photographed.

The present invention is an improvement in the mechanism for controlling the diaphragm opening for a camera by means of a photoelectric cell. In such devices it is normal to use an indicating or measuring device which includes a pointer which is deflected in accordance with the lighting conditions. In known mechanisms of this type, the pointer was stopped or held in an indicating position by clamping means which bore down upon or weighted the pointer member and eventually caused wear or misalignment to an extent to interfere with its normal operation.

The present invention is an improvement over devices of this character, particularly in an arrangement in which the pointer member is held stationary in a correct light indicating condition, under the restraining force of a very light spring. The mechanism includes a scanning member which determines the amount of the diaphragm opening and which is arrested in accordance with the photoelectric cell controlled pointer indication by an additional plate member which is set by the pointer. Thus the scanning member is positioned by the plate member without coming into contact with the pointer.

The invention includes a shutter releasing mechanism which may be depressed by finger pressure to cause a stepped plate member to move over the pointer, at its position indicating the correct lighting conditions, and arrest it at such position. The shutter releasing mechanism moves the plate member through the medium of a pin which may be moved relatively to the releasing member against the force of a light spring. Thus the pointer member is never clamped with a large restraining force and never receives the full restraining force of the finger actuated releasing mechanism.

The releasing mechanism includes means for releasing a diaphragm ring to cause diaphragm leaves to move from a fully open position toward a closed position by an amount determined by the movement of the scanning member in a direction to intersect the plate in accordance with the position at which the plate arrests the pointer member. Thus, after the shutter releasing mechanism effects initial positioning of the diaphragm control plate, it also effects release of the diaphragm ring in order to close the diaphragm opening by an amount as determined by the position of the pointer and the movement of the scanning member. The shutter mechanism further includes means for effecting actuation of the shutter but such forms no part of the present invention.

Accordingly it is an object of the present invention to provide an improved camera diaphragm opening control mechanism.

A further object of the invention is to provide a camera having a photoelectric cell and including a measuring device for indicating the intensity of light on a subject to be photographed and means for arresting the indicator in this indicating position and for effecting closing of the diaphragm from a fully open position by an amount to correspond to the indication of the pointer.

A further object of the invention is to provide an improved camera diaphragm opening control mechanism including a movable plate actuable by a shutter releasing mechanism and effective to arrest the pointer of a measuring device in response to light intensity sensed by a photoelectric cell, said plate further including means for arresting a scanning device in accordance with the lighting conditions indicated by the pointer and wherein the scanning device determines the opening of the diaphragm.

A further object of the invention is to provide a photoelectric diaphragm control for cameras including pointer means for indicating the intensity of light on the subject to be photographed and means for intercepting said pointer means, for initiating closing movement of said diaphragm, and for arresting such closing movement in accordance with the location of said pointer means.

A further object of this invention is to provide a photoelectric diaphragm control for cameras which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

The invention is described below with reference to the following drawings.

Figure 1:
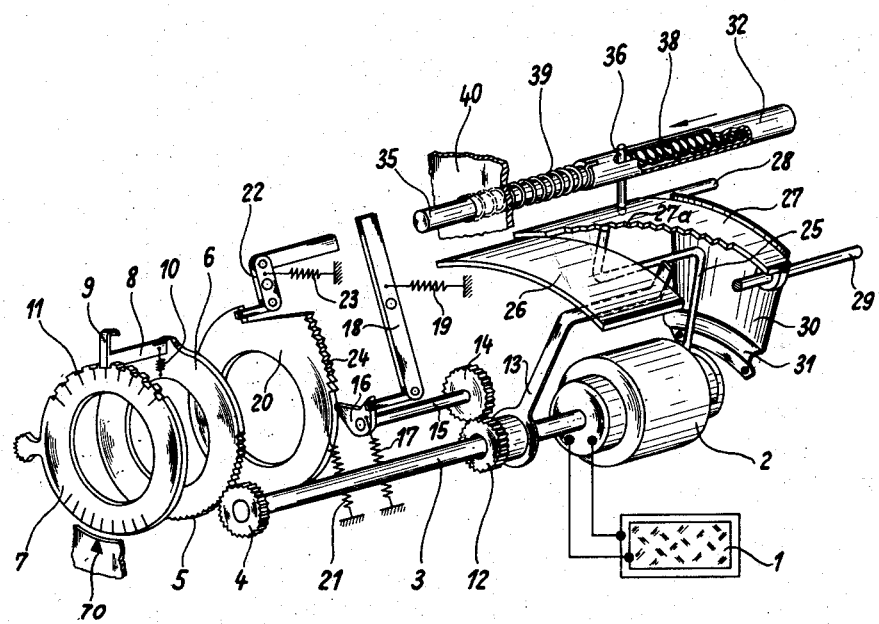
FIG. 1 is a fragmentary perspective view of a photoelectric diaphragm control constructed in accordance with the invention.

Referring to the drawings in particular the invention embodied therein as indicated in FIG. 1 includes an exposure device comprising a photoelectric cell 1 and a measuring device 2 having a shaft 3 rotatably mounted in bearings within the device and rotatable in proportion to the intensity of light falling on the photoelectric cell 1. The measuring device 2 is a well known electro-magnetic device whose indicating characteristic is linear. The measuring device is provided with a pinion 4 affixed to the outer end of shaft 3, which meshes with a gear rim 5 of a ring or collar 6 suitably mounted in a camera housing for rotation. This rotating collar 6 is provided for setting the diaphragm control mechanism in accordance with the film sensitivity of the negative material employed and it is coupled through a detent lever arm 8 to a setting ring or collar 7 for adjusting the shutter exposure times. The detent lever arm 8 includes an extension or handle 9, and in its position of rest it is biased by a spring 10 into one of a plurality of notches 11 on the collar 7 which correspond to film sensitivities in appropriate sensitivity units such as DIN degrees or in ASA numbers.

Another pinion 12, to which a scanning indicator or pointer 13 is rigidly attached, moves freely on the shaft 3 and is driven by a gear 14 which is mounted at one end of a shaft 15. Affixed to the other end of this shaft 15 there is a pawl 16, biased by the tension of a spring 17 in a clockwise direction as seen from the left in FIG. 1. In the position of rest shown, the pawl 16 is blocked by an arm of a two-armed locking lever 18 which is under the tension of a spring 19.

The main projection of the pawl 16 rests against a diaphragm or shutter ring 20 which is rotatably mounted and which actuates the diaphragm blades by such rotation. The diaphragm blades are not shown for the sake of clarity. The diaphragm ring itself is under the tension of a spring-wound motor, indicated by a tension spring 21 for the sake of simplicity. When wound up and in a state of rest, a stop of the diaphragm ring 20 rests against a three-armed locking lever 22 which is under the tension of a spring 23. The diaphragm ring 20 also includes step-shaped teeth 24 provided in a tangential direction along at least one portion of its periphery.

The measuring device 2 includes an offset indicator arm or pointer 25 which is rotated upon actuation of the device in accordance with light falling on the photoelectric cell 1. The upper end of the arm 25 moves along the edge of a curved stationary stop plate 26. The upper end of the scanning pointer 13 moves in the same plane as the upper part of the measuring device arm 25.

A curved scanning plate 27 is disposed above and overlaps the plate 26 and it is slideable axially along angularly spaced stationary guide bars 28 and 29. The scanning plate 27 is provided with a stepped edge 27a and this edge can be moved toward the two pointers 13 and 25 and the stop plate 26 for controlling the limits of movement thereof. A broad, segment-shaped leaf spring 30, which has an arc-shaped bead 31 adjacent its inner edge, is affixed so that the bead is a short distance away from the pointer 25, without touching it. In its rest position the upper edge of the leaf spring, which exerts a force in the direction of the pointer 25, rests against the rear end of the scanning plate 27 to urge it in the same direction.

Figure 2:
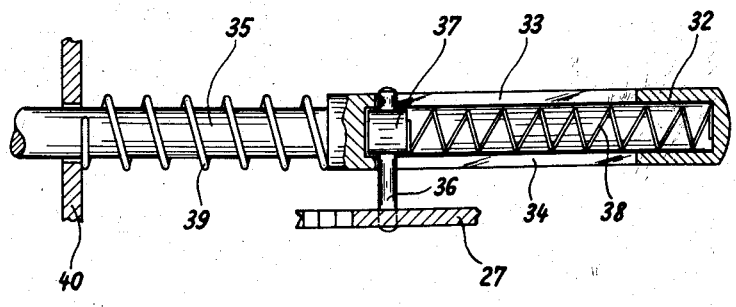
FIG. 2 is an enlarged fragmentary section of a portion of the mechanism indicated in FIG. 1.

The device employed to trip the regulating action and to actuate the shutter is shown in cross section in detail in FIG. 2. It consists of a cylindrical release member 32 having diametrically opposite axially elongated slots 33 and 34 and a shaft 35 attached to the member 32 and extending outwardly from one end. A follower pin 36 is rigidly attached to the scanning plate 27 at one end. Its opposite end is affixed to a cylindrical block 37. The block 37 is slideable to the sleeve-shaped member 32 and the follower pin is guided back and forth along the slots 33 and 34. This block guide makes it possible for the follower pin 36 to slide without friction in the two slots 33 and 34. Within the sleeve member 32 there is a weak spring 38 which rests against the block 37 and urges it to the left as seen in FIG. 2. A stronger spring 39 is wrapped around the shaft 35 and rests against the sleeve member 32 and a partition wall 40 of the housing through which one end of the shaft 35 projects.

The arrangement described operates as follows:

First, the detent lever arm 8 is raised and the shutter time setting collar 7 is rotated appropriately to set the film sensitivity of the film material employed. After the lever arm 8 has reengaged, the two setting collars 6 and 7 are rigidly connected together and can be rotated together by turning the shutter ring or collar 7.

Then the shutter is cocked, the spring-wound motor 21 being wound at the same time. This cocking and winding can, of course, also be coupled with film advance.

The camera is now ready for action, the diaphragm being wide open. The diaphragm or shutter ring 20 is then in the position shown in FIG. 1.

A given exposure time is preselected by turning the shutter time ring 7 past an index mark 70. The camera is then pointed at the object to be photographed. The measuring device pointer 25 then deflects more or less, depending upon the brightness of the object.

When the member 32, which serves as a release, is then pressed in the direction indicated by the arrow in FIG. 1, the following operations occur.

The sleeve member 32 together with the shaft 35 attached to it move in the direction of the arrow against the action of the spring 39, carrying the scanning plate 27 along in the same direction via the pin 36. This releases the leaf spring 30 which rested against the scanning plate 27 in its rest position. The bead 31 of this spring now presses lightly against the lower part of the measuring-device pointer 25, thus holding the latter fixed in position. Then the upper part of the measuring-device pointer 25 is engaged by one of the stepped stages on edge 27a of the scanning plate 27, depending upon its position, and pressed against the stop plate 26. The holding of the pointer by the spring bead 31 is intended to prevent the pointer from jumping if it should have taken a position at which it meets an edge between two adjacent steps.

Now the drive pin 36 slides in the guide slots 33 and 34 of the sleeve member 32, against the pressure of the comparatively weak spring 38. This so-called "spring weakness" causes only an accurately selectable pressure of the spring 38 to be exerted on the pointer 25 through the scanning plate 27, this pressure being completely independent of the finger pressure on the release member 32.

Once the pointer 25 has been fixed in position, the shaft 35 continues to move in the direction of the arrow, first striking against the upper part of the locking lever 18. This releases the pawl 16. As the latter is under tension of the spring 17, it rotates clockwise and moves the scanning indicator 13 toward the measuring-device pointer 25 via the shaft 15, the gear 14 and the pinion 12. The plane in which the bent-up end portion of the scanning indicator 13 moves no longer coincides with that of the measuring-device pointer 25, as the latter has been flexibly pushed by the scanning plate 27 in the direction of the stop plate 26. That is why the scanning pointer cannot strike the sensitive measuring-device pointer, but is stopped by another step on the edge of the scanning plate 27. As the follow-up pointer 13 is stopped, the rotation of the pawl 16 is likewise stopped. Its projection now takes a position that determines the diaphragm opening, in accordance with the light as measured.

Then the upper part of the locking lever 18 presses against the other locking lever 22, which then releases the diaphragm setting ring 20, so that the latter begins to turn clockwise under the action of the spring-loaded motor 21, closing the wide-open diaphragm blades until one of the teeth 24 comes to rest against the projection on the pawl 16, thus stopping the rotary motion of the diaphragm setting ring.

The last operation is then the release of the shutter corresponding to the preselected exposure time, after a certain time delay. After the picture has been taken and the spring-loaded motor 21 has been wound, and after the pawl 16 and the locking levers 18, 22 have been automatically returned to their original positions, all moving parts resume the position shown in FIG. 1.

Figures 3, 4:
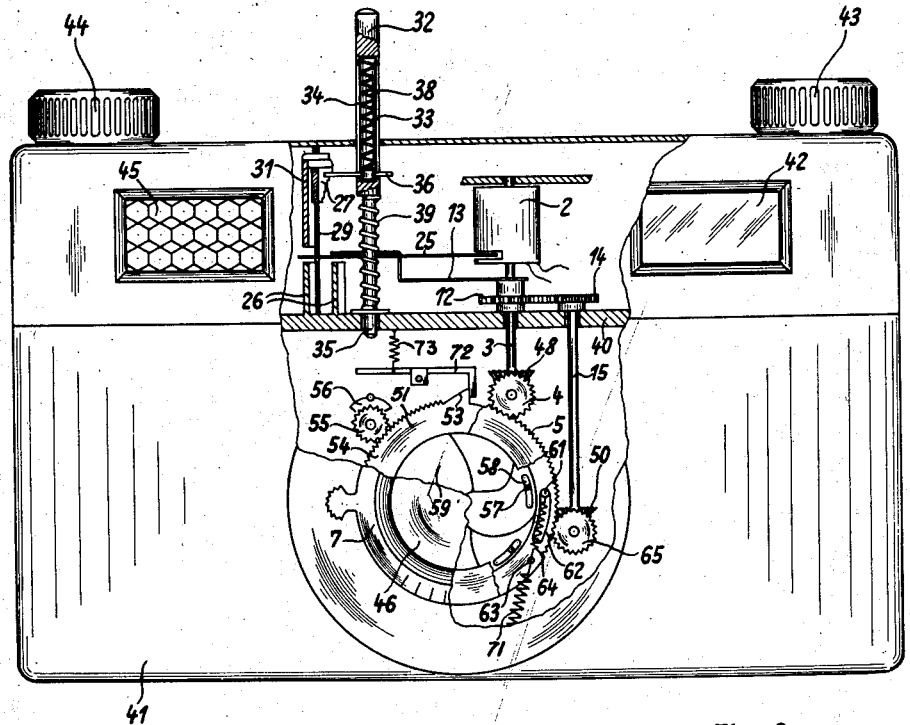
FIG. 3 is a photographic camera having the photoelectric diaphragm control.
FIG. 4 is a perspective view of the photoelectric diaphragm control mechanism of the camera indicated in FIG. 3.

The diaphragm regulator of the invention is shown in a practical embodiment in FIGS. 3 and 4, more particularly, built into a camera in FIG. 3, while the essential parts are shown separately in FIG. 4. The parts whose functions are the same as those shown in FIGS. 1 and 2 have the same notations as in FIG. 1.

The camera consists in known manner of a housing 41 with a view finder 42, a rewind knob 43 and a film-advance knob 44. At the top in the front wall of the camera a honeycomb lens 45 is also mounted, behind which a photoelectric cell similar to cell 1 (not shown here) for the exposure measuring device is mounted in known manner.

The exposure measuring device 2 proper is mounted in the upper portion of the camera housing, which is separated by the partition wall 40. The other parts of the exposure regulator are arranged about an objective 46.

Since, in contrast to FIG. 1, the mechanical transmission elements are arranged in two planes perpendicular to each other, bevel-gear pairs 47, 48 and 49, 50 are provided between a shaft 83 carrying the pinion 4 and the shaft 3 on the one hand, and between a shaft 85 carrying a pinion 65 and the shaft 15 on the other hand, so as to make is possible to transmit the rotations of the pinions 4 and 65 to the measuring device. Thus, shafts 83 and 85 can be considered the continuation of respective shafts 3 and 15.

The diaphragm ring denoted by 20 in FIG. 1 is divided in this embodiment into the two rings 51 and 52. The ring 51 is provided with a release escapement cam 53 which is meshed with a release intermediate lever 72 biased by a spring 73 (which has been omitted in FIG. 4 for the sake of clarity). The ring 51 is also provided with a gear rim 54, meshing with a pinion 55. The latter together with an escapement 56 constitutes an escapement mechanism of known design.

The diaphragm ring 52 proper actuates diaphragm blades 59 of the camera diaphragm through a series of pins 57 affixed thereto at spaced locations. Each pin extends into a slot 58 of an associated blade 59. These blades 59 are rotatably mounted on a fixed pivot 60. The diaphragm ring 52 is driven by the shaft 15 through the intermediary of bevel-gear pair 49, 50, shaft 85 and pinion 65, as explained hereinabove. The two diaphragm rings 51 and 52 are connected together by a follower pin 61 which can slide within the confines of a slot 62 of the ring 52. The ring 52 also has a fixed pin 63 which is connected with the follower pin 61 through a spring 64 and to a spring 71 which is much stronger than the spring 64.

The mode of operation of this practical embodiment according to the invention is of course the same as in the basic arrangement shown in FIG. 1. First, the detent lever arm 8 is lifted and the shutter time ring 7 is turned appropriately to set the film sensitivity of the film employed. After the lever arm 8 has reengaged, the shutter time is set by moving the handle on ring 7 to turn the two rings 6 and 7, which are now rigidly coupled together, this setting being positively transmitted to the measuring device 2 by appropriate rotation via the parts 5, 4, 83, 47, 48 and 3.

Then the release member 32 is pressed. The downward motion of parts 31 and 27 transmitted by the pin 36 first causes the part 31 to clamp the pointer 25 through the action of the spring 30, which is here designed as a coil or roller spring. As the release member 32 continues to move, the plate 27 moves further until its toothed edge 27a touches the measuring-device pointer 25. During this time the pin 36 slides in the slot 33 of the release member 32, as in FIG. 1.

As the release or sleeve member 32 continues to move, the pin 36 presses against the intermediate release lever 72, so that the latter releases the locking pawl 53 of the ring 51. The spring-wound motor represented by the strong spring 71 now rotates the ring 52 and the ring 51 as well, through the transmission pin 61 resting against the upper edge of the slot 62, clockwise until the scanning indicator 13 which follows this motion through the intermediate parts 65, 85, 49, 15, 14, and 12, strikes against one of the steps in the edge of the scanning plate 27. As in FIG. 1, this is the step adjacent to the one resting against the pointer 25. In this motion of the system just described the diaphragm blades 59 are opened more or less by the pin 57 fastened to the ring 52, depending upon the position of the scanning plate 27 and hence as a function of the light available for photography. Once this position of the diaphragm has been reached, the spring 64 further rotates the ring 51 as far as a certain end position, which is always the same for a given exposure, the pin 61 being able to slide in the slot 62 correspondingly. In this end position the camera shutter is released through special means actuated by the cam 53 of the ring 51 which has traveled further in the interim, thus taking the picture. The release mechanism is of known type and not shown, as it is not part of the invention.

Thus it can be seen that in the first embodiment of the invention a mechanism is shown and described with general application to cameras of various types and in the second embodiment, as indicated in FIGS. 3 and 4, the mechanism is incorporated on a particular type or design of camera. In the first embodiment the releasing mechanism including the sleeve member 32 may be depressed by finger pressure and, as seen in the drawings, this first causes the movement of the stepped plate 27. The plate 27 releases the spring 30 which moves inwardly against the indicator or pointer 25 to lightly hold the latter until the plate 27 is moved an additional amount to cause engagement of the pointer with one of the stepped portions of the plate. Upon further movement of the releasing mechanism or member 32 in the direction of the arrow of FIG. 1, the mechanism is actuated to permit release of the pawl 16 and rotation of the scanning indicator 13 until its upper edge lodges on one of the steps of the plate 27.

It should be appreciated that the plate 27 thus controls the amount which the diaphragm will move from an open position in a direction towards a closed position before it will be again arrested by the projection of the pawl 16 and one of the projections or teeth 24 on the diaphragm ring 20. Thus if the pointer had been in a position so that the plate 27 had to be moved inwardly until the step next to the last from the right as indicated in FIG. 1, engaged the pointer, then the scanning indicator 13 can only move inwardly until it engaged the last step and hence the diaphragm would not close to any great extent. However, if the pointer were arrested on the next to the last step on the other end of the plate to the left, as indicated in FIG. 1, then the scanning indicator 13 could move inwardly to the next adjacent step before it would be arrested. This inward rotation of the scanning indicator 13 determines the angle at which the pawl 16 would be displaced. Upon further movement of the releasing member 32, the triple arm lever 22 is released and the diaphragm ring 20 starts to rotate under the force of the spring motor 21. This rotation may continue until one of the projections 24 will no longer clear the pawl 16 and hence the ring will be arrested.

A feature of the construction just described in FIG. 1 is the releasing mechanism which effects inward movement of the step plate 27 to clamp the pointer 25. Once the plate 27 is moved to a pointer clamping position, further inward movement of the sleeve member does not exert a greater restraining force on the pointer since the spring 38, which is a very weak spring, merely compresses to permit the pin 36, which initially moves the plate 27 inwardly, to move backwardly relatively to the sleeve member 32. A further feature is the fact that the plate member is arrested in the position determined by the pointer and the plate member itself causes arresting of the scanning member rather than the pointer member doing so.

In the second embodiment as indicated in FIGS. 3 and 4, the mechanism is shown embodied on an actual camera. In this construction the releasing mechanism is shown in an upright position and the upper end of the sleeve member 32 forms a pin which may be depressed by the fingers to set the diaphragm opening and to cause release of the shutter after the diaphragm opening is set. The diaphragm control mechanism is similar to that indicated in FIGS. 1 and 2, with the principal exception that the diaphragm ring directly drives the scanning member through a gearing and its rotation is stopped upon the scanning member intercepting the plate 27, as in the other embodiment.

In FIGS. 3 and 4, it is indicated how the diaphragm leaves 59 are pivotally mounted on the diaphragm ring and each includes a slot through which an opening control pin 57 extends. When the camera is not operating the mechanism is effective to move the ring 52 so that the diaphragm leaves assume a fully opened position. Such a condition would be for taking pictures when the lighting intensity is very low. When the lighting intensity increases beyond this point as determined by the indication of pointer 25, the releasing mechanism is effective to rotate the ring 51 and therefore close the diaphragm by an amount equivalent to the change in lighting conditions.

While specific embodiments of the invention have been shown and described in detail to illustrate the application of the invention principles, it will be understood that the invention may be embodied otherwise without departing from such principles.

What is claimed is:

1. A photoelectric diaphragm control device for cameras having a diaphragm, pre-tensioned diaphragm actuating means for shifting said diaphragm from a substantially open to a relatively close position, releasing means for said actuating means, photoelectric light measuring means including a photoelectric cell responding to the light impinging on it from the direction of an object to be photographed, comprising pointer means actuated by said measuring means and swingable along an arcuate path so as to assume an indicating position, stationary stop means having an abutting edge in the region of and substantially parallel with said path, a control plate member reciprocable in a direction substantially perpendicular to said path upon actuation of said releasing means, pre-arresting means shiftable towards said pointer means upon movement of said control plate member and having a portion adapted to pre-bias said pointer means against said stop means before its engagement with said control plate member, a scanning member swingable along a second arcuate path parallel to said path of the pointer means, the direction of swing of said pointer means and said scanning member along their respective paths corresponding to said shifting of the diaphragm, a plurality of stepped portions on said control plate member, one of said stepped portions engaging said pointer means upon the latter having been pre-biased, so that manual actuation of said releasing means will move said control plate member towards said pointer means occuping said indicating position, said portion of the pre-arresting means will then pre-bias said pointer means in said indicating position, said one stepped portion of the control plate member will thereafter engage said pointer means and urge it firmly against said stop means, said scanning member swinging at the same time along said second path and abutting against a stepped portion adjoining said one stepped portion on the control plate member, whereby said movement of the diaphragm is positively stopped, upon being released by further actuation of said releasing means, at an intermediate position corresponding to said indicating position of the pointer means.

2. A photoelectric diaphragm control device according to claim 1 wherein said actuating means includes a spring-biased engaging member for the moving said said control plate and the releasing of said prearresting means in the direction of said pointer means, and mechanical means for said shifting of the diaphragm.

3. A photoelectric diaphragm control device acording to claim 1, further comprising locking means to hold said diaphragm in said open position, and wherein said actuating means includes a spring-biased member for disengaging said locking means after said control plate member and said pre-arresting means have been actuated thereby.

4. A photographic diaphragm control device according to claim 1 wherein said pre-arresting means has a leaf spring and said portion of the pre-arresting means is an arcuate bead on said spring protruding from the latter in said direction perpendicular to said path of the pointer means.

5. A photographic diaphragm control device according to claim 1 wherein said pre-arresting means has a coil spring biasing said portion of the pre-arresting means towards said path of the pointer means.

6. A photographic diaphragm control device acording to claim 1, further comprising gear means interconnecting said scanning member for simultaneous movement in unison with said diaphragm.

7. In a photoelectric diaphragm control for cameras having rotatable diaphragm ring means for adjusting the diaphragm opening, a photoelectric cell adapted to be directed at the subject to be photographed, and pointer means operatively connected to said photoelectric cell and movable in proportion to energization thereof by light falling on said photoelectric cell, the improvement comprising a movable shutter releasing member including a sleeve member, a movable scanning member connected to said diaphragm ring means directly by gears and movable therewith, means for biasing said diaphragm ring means to a closed position, locking means to hold said diaphragm ring means in an open position and including a lever member disposed in the path of said shutter releasing member, means for biasing said lever member into a locking position, and control means connected to said shutter releasing member and including means movable thereby to hold said pointer means at an indicating position, said control means further including a plate member connected to said shutter releasing member and including an edge for engaging and holding said pointer means at said indicating position, said level member being movable out of said locking position upon contact thereof by said shutter releasing member after said pointer means has been held at said indicating position, the connection between said plate member and said sleeve member being through a light-action spring, whereby to permit relative movement of said shutter releasing member and said plate member upon the latter encountering said pointer means, so that once said pointer means is held by said edge, said shutter releasing member will disengage said locking means, the resulting movement of said scanning member and said diaphragm ring means being stopped after closing of said diaphragm ring means by an amount determined by said indicating position.

8. In a photoelectric diaphragm control for cameras having rotatable diaphragm ring means for adjusting the diaphragm opening, a photoelectric cell adapted to be directed at the subject to be photographed, and pointer means electrically connected to said photoelectric cell and movable in proportion to energization thereof by light, the improvement comprising a movable shutter releasing member, a scanning member including a portion movable in the same plane as said pointer means, means for biasing said diaphragm ring means to a closed position, locking means to hold said diaphragm ring means in an open position and said scanning member in a corresponding extreme position, control means connected to said shutter releasing member and including means movable thereby to hold said pointer means in an indicating position and upon further movement to release said locking means to permit movement of said diaphgram ring means and said scanning member, said control means including means disposed to arrest movement of said scanning member after movement proportional to light intensity as indicated by said pointer means, and limiting means connected to said scanning member and effective upon said proportional movement of the latter to prevent further movement of said diaphragm ring means toward said closed position, and limiting means including a rotatable pawl, the position of which is set by movement of said scanning member, said diaphgrm ring means including a series of stepped ratchet members, one of which being engageable with said pawl to stop said diaphragm ring means in accordance with said position of the pawl.

References Cited in the file of this patent

UNITED STATES PATENTS

| | | |
|---|---|---|
| 2,206,626 | Blechner | July 2, 1940 |
| 2,868,095 | Gebele | Jan. 13, 1959 |
| 2,949,070 | Frost | Aug. 16, 1960 |
| 2,969,004 | Gebele | Jan. 24, 1961 |

UNITED STATES PATENT OFFICE
CERTIFICATE OF CORRECTION

Patent No. 3,072,027 January 8, 1963

Max Köck

It is hereby certified that error appears in the above numbered patent requiring correction and that the said Letters Patent should read as corrected below.

Column 7, line 15, for "close" read -- closed --; line 39, for "occuping" read -- occupying --; line 54, for "said said" read -- of said --; line 55, for "prearresting" read -- pre-arresting --.

Signed and sealed this 3rd day of September 1963.

(SEAL)
Attest:

ERNEST W. SWIDER
Attesting Officer

DAVID L. LADD
Commissioner of Patents